July 29, 1930.  R. S. BROWN  1,771,840
SHARPENING DEVICE
Filed Jan. 11, 1927   2 Sheets-Sheet 1

INVENTOR
Robert S. Brown
BY
ATTORNEYS

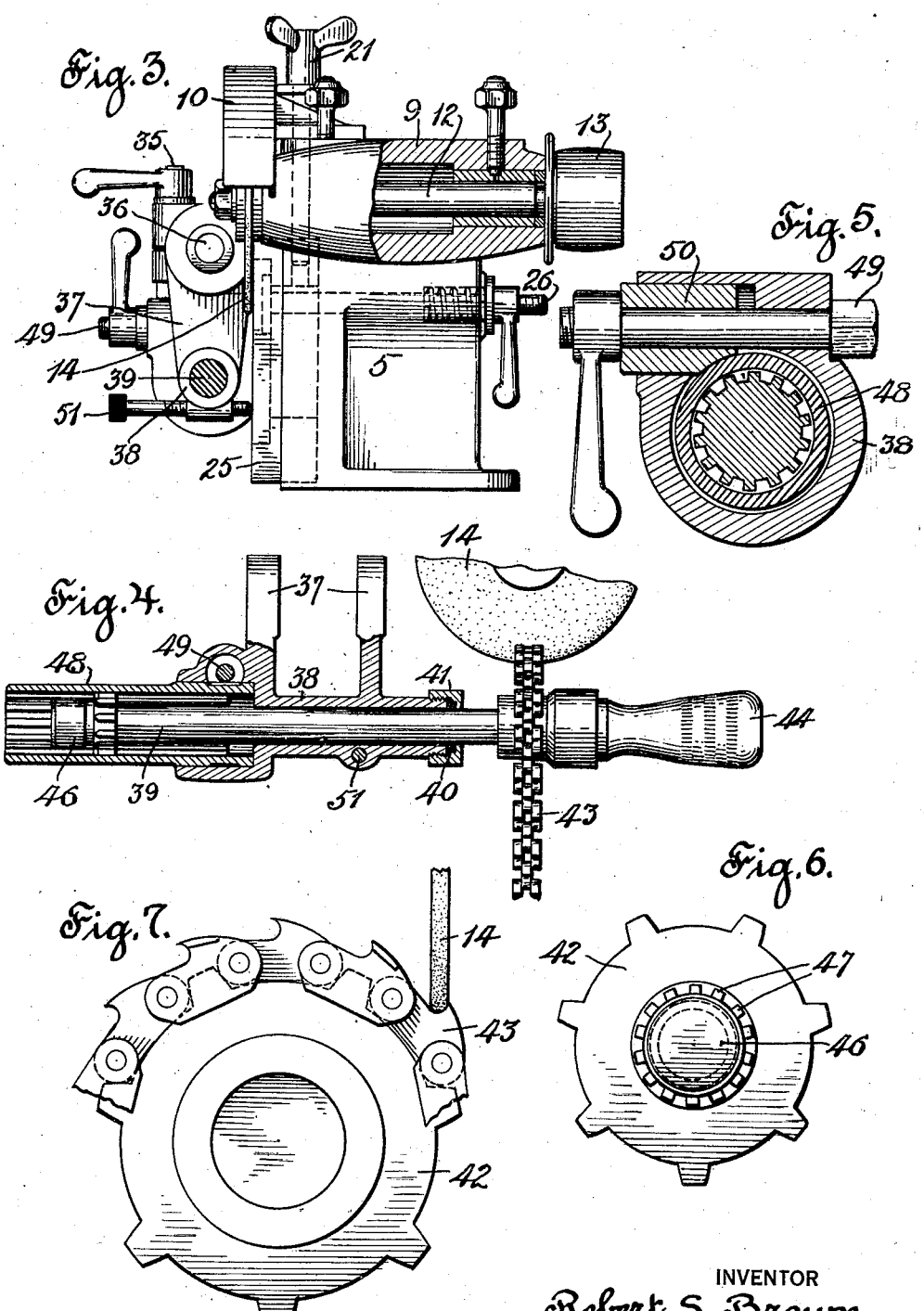

Patented July 29, 1930

1,771,840

UNITED STATES PATENT OFFICE

ROBERT S. BROWN, OF NEW BRITAIN, CONNECTICUT, ASSIGNOR TO THE NEW BRITAIN MACHINE COMPANY, OF NEW BRITAIN, CONNECTICUT, A CORPORATION OF CONNECTICUT

SHARPENING DEVICE

Application filed January 11, 1927. Serial No. 160,354.

This invention relates to machines for sharpening cutter teeth, and is of particular utility for the purpose of sharpening the teeth of a chain cutter such as used on chain mortising machines. The present invention is primarily an improvement on the construction set forth in my former patent, 896,357, dated August 18, 1908, and has for its object the provision of novel means designed to mechanically guarantee a substantially uniform grinding of all of the chain teeth so that they will be of the same height whereby each tooth will perform its proper share of the work to be done. The construction is also such that the grinding machine may be adjusted so as to cut the teeth with different degrees of hook; that is to say, a tooth for working on soft wood should desirably have a different degree of hook than that intended to work on hard wood. These and other objects will be apparent to the mechanic skilled in this art from a reading of the following description. While I have shown my invention as applied to sharpening the teeth on a chain cutter for a mortising machine, the use of the invention is not necessarily limited thereto as it is obvious that various modifications and changes, such as might be desirable in the different uses to which the invention might be put, might be made.

In the accompanying drawings which show one preferred embodiment of my invention—

Fig. 3 is a front elevation showing certain parts in section;

Fig. 4 is a view partly in section of certain parts corresponding to like parts shown in Fig. 2, but in a different position;

Fig. 5 is a section on the line 5—5 of Fig. 1, certain parts being in elevation;

Fig. 6 is an end elevation of certain details;

Fig. 7 is a relatively enlarged view of a sprocket with a part of a chain cutter thereon showing part of a grinder in position to grind a tooth on one of the chain links.

Figure 1:
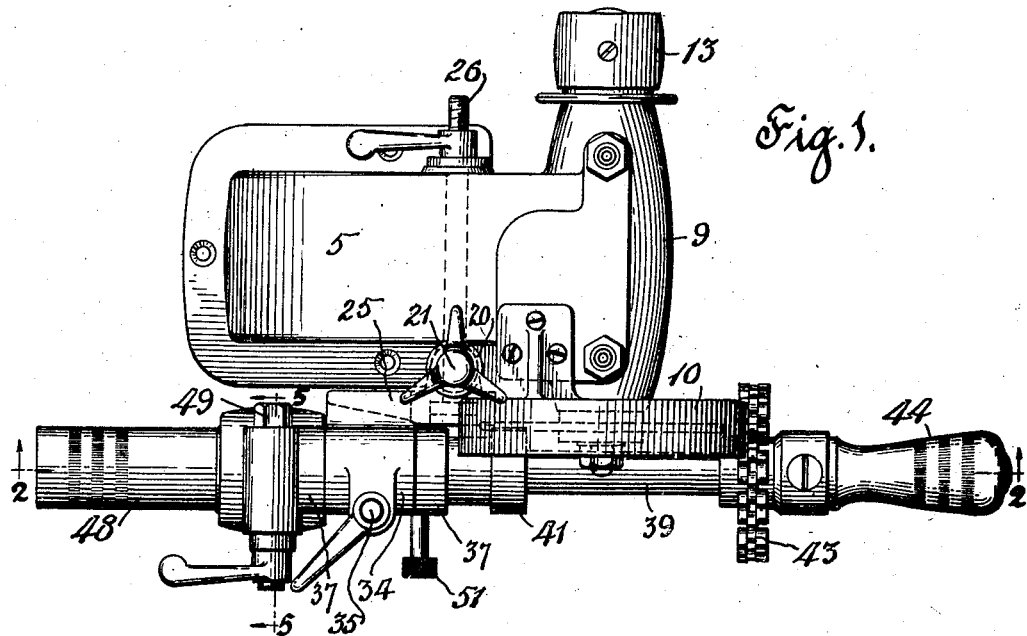
Fig. 1 is a top plan view.

5 represents the frame of the machine having a suitable base designed to rest upon an appropriate support. The upper part of the frame is projected forwardly and is provided with a cross bearing 9 in which is journaled a shaft 12 for the grinding tool 14, which in this particular instance is in the form of a disc wheel. 13 is a belt pulley on the opposite end of the shaft 12, which may receive a driving belt as one conventional means for driving the grinding disc 14. 10 is a hood for the grinding disc 14, the same being secured to the top of the frame in any desired manner so as to overstand the disc and protect the operator. 25 is a vertically adjustable carriage mounted in a suitable guideway on the side of the frame just back of the disc 14. This carriage is adjustable by any suitable means such as an adjusting screw 21 having a wing nut at its upper end, said screw being rotatable in a suitable boss 20 carried by the frame. 26 is a clamping bolt which serves to clamp the carriage 25 tightly against the frame when its proper vertical adjustment has been effected. Thus far it might be said that the parts described correspond closely to the correspondingly numbered parts of the machine shown in my former patent.

34 is a bearing on the upper part of the carriage 25, said bearing furnishing a fore and aft passage for a shaft 36. This bearing is slitted at one side, and is provided with a clamping bolt 35, whereby the bearing may be tightened to hold the shaft 36 against turning, or loosened to permit said shaft to turn for adjustment purposes. 37—37 are arms fixed to the ends of the shaft 36 and depending therefrom, said arms being connected at their lower ends by a tubular bearing 38 forming in effect a swinging bracket. In this bearing, a rod or shaft 39 is rotatably and longitudinally movable for the purpose hereinafter described. This rod is in reality the work carrier. One end of the bearing 38 terminates just to the rear of the grinding disc 14 and may be provided with a packing washer 40 and a packing nut 41 therefor, the packing being to exclude from the rod bearing any thrown off particles of steel from the chain, or abrasive from the disc, during the grinding operation. Near the outer end of the rod 39 is secured a sprocket 42, on which the chain cutter is positioned when it is to be sharpened. 43—43 represent some of the links of such a chain cutter, the same being shown in place on the sprocket ready for the grinding operation. Outside of the sprocket I preferably provide a handle 44 by which the work carrying rod 39 may be manually moved longitudinally in its bearing 38 and rotated therein as and when described. The opposite end of the rod 39 is provided with a head 46 having at its rear part longitudinal splines or ribs 47. 48 is a sleeve mounted on the rear end of the bearing 38, the same being provided with internal longitudinal grooves to receive the splines or ribs 47 so that when said splines slide in said grooves, the rod 39 and sprocket 42 will be mechanically held against rotation, and thus the indexing means performs the added important function of a guide. The forward end of the head 46 may make a sliding and rotating fit within the sleeve 48, and the forward ends of the splines 47 may be sufficiently pointed or beveled to easily enter the indexing grooves in said sleeve 48 when the rod 39 is advanced from the position shown in Fig. 2. In the form shown in the drawings, it will be observed that there are a plurality of splines 47 entirely around the head 46, and there are a corresponding number of longitudinal grooves in the sleeve 48, said splines and grooves being so placed that the rod 39 can be given a uniform step by step rotation from one operative position to another operative position. In the particular form shown in the drawings, the sprocket 42 has seven teeth while the splines on the indexing device are fourteen in number. This gives the indexing device fourteen operative positions so that any pitch of chain with a mating seven-toothed sprocket will be properly spaced without any change in the indexing device. That part of the bearing 38, which receives the sleeve 48, may be somewhat enlarged and recessed so as to receive the end of the indexing sleeve 48, and the mounting is preferably such that the sleeve may be adjusted angularly about its own axis. In Fig. 5 I have shown in detail one convenient means for accomplishing this end. In this figure, 49 is a bolt which passes through the enlarged end of the bearing sleeve 38 tangentially to the sleeve 48. At one end of the bolt 49 is a friction shoe 50, which is located in a recess in the side of the bearing 38. This friction shoe 50 engages the side wall of the sleeve 48, which may be slightly grooved if desired. When the bolt 49 is tightened up, the shoe 50 will grip the sleeve 48 and hold it firmly in its adjusted position. 51 is an adjusting screw in the lower part of the swinging bracket which carries the rod 39. This screw may have a knurled head on its outer end while the inner end bears against the side of the carrier slide 25. By turning this screw, the work carrying rod 39 and the indexing means may be adjusted laterally relatively to the grinding disc. To effect this adjustment, the clamping bolt 35 is first released, freeing the shaft 36, so that by turning the screw 51 in one direction or the other the lower end of the bracket carrying the rod 39 may be moved to the desired lateral position. When this adjustment has been effected, the bolt 35 is again tightened up to lock the shaft 36 against rotation and thereby hold the rod 39 in said position of adjustment.

Figure 2:
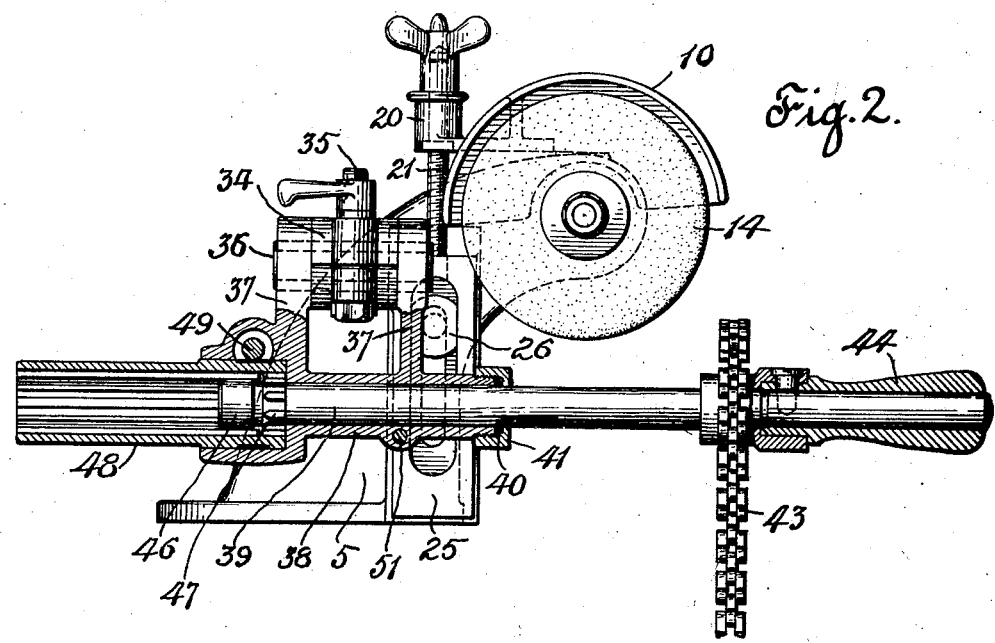
Fig. 2 is a side elevation, certain parts being shown in section on the line 2—2 of Fig. 1.

*Operation:* When the parts are assembled, the operator pulls out the work carrying rod 39 so that a chain cutter 43 may be placed on the sprocket 42 (see Fig. 2). He then pushes the rod 39 forwardly, whereupon the indexing splines on the head 46 will engage in the complementary indexing grooves in the sleeve 48. He then advances the rod until the cutter chain approaches sufficiently near to the lower side of the cutting disc 14 to enable him to determine whether the action of the disc on the particular tooth as now guided by the indexing device will be proper. If he finds that any adjustment is required, it is possible for him, by using the various adjusting means, to raise or lower the work carrier and to move it laterally so that when the shapening operation is to occur, the wheel 14 will grind each individual tooth on the chain to the same degree and at the desired angle or hook. When the proper adjustment of the various parts has been effected, the operator usually grasps the depending part of the chain below the sprocket with one hand to hold the chain snugly on the sprocket. Then, with the other hand, he advances the rod 39. This carries the work forwardly to and under the grinder 14 (see Fig. 4). When the tooth has been ground to its full depth, the operator draws the rod 39 outwardly and turns it to the next indexing position which will bring the next chain tooth into the proper grinding line, whereupon, the aforesaid operation is repeated until all of the teeth have been successively ground. It will be apparent that the amount of skill required to produce accurate and uniform grinding is greatly lessened since, when the parts have once been adjusted by an expert, the labor of grinding the chain may be turned over to the mechanic of less skill. It will also be apparent that, during the grinding operation, the work is held against the grinding disk mechanically by the combined guiding and indexing mechanism so that the operator has merely to push the work carrier forwardly, the twisting strain thereon being all resisted by said indexing means.

Since the work carrier may be adjusted both up and down and laterally with respect to the grinding element, and since the indexing positions are preferably in excess of the actual number of sprocket teeth required to support the chain cutter, it is possible to grind all the teeth on the chain cutter uniformly as to the desired depth and hook, a result greatly to be desired because, in the operation of a chain cutter, it is very important that each tooth shall do its own full share of the work to be done.

I claim:

1. A grinder for grinding corresponding teeth on a cutting device, comprising a rotary grinding tool, a work carrier comprising a shaft rotatable and slidable longitudinally to present the work to the operation of the grinding tool, a support for the shaft, and an indexing means including corresponding projections and grooves on said shaft and its support, concentric with said shaft and coacting therewith to positively hold the same against rotation during the grinding operation, said shaft being rotatable relatively to said indexing means when said work carrier stands in a non-grinding position.

2. A grinder for grinding corresponding teeth on a cutting device, comprising a rotary grinding tool, a work carrier comprising a shaft rotatable and slidable longitudinally to present the work to the operation of the grinding tool, a support for the shaft, interengaging projections and grooves on said support and shaft to positively hold the shaft against rotation during the grinding operation, said shaft being rotatable relatively to said support when said work carrier stands in a non-grinding position, and means for shifting the shaft support for adjusting the position of the shaft relatively to the grinding tool.

3. A grinder for grinding corresponding teeth on a cutting device, comprising a frame, a bracket, a rotary grinding tool, a work carrier comprising a shaft supported by said bracket and slidable longitudinally relatively to said bracket to present the work to the operation of the grinding tool, a sleeve carried by said bracket and surrounding a part of said shaft, said sleeve being normally held against rotation in said bracket, said sleeve and said shaft having interengaging projections and grooves which coact to hold the shaft against rotation during the grinding operation, said shaft being rotatable relatively to said sleeve when said shaft is in a non-grinding position, one of said two last mentioned members being rotatably adjustable relative to said bracket when said shaft is in its grinding position.

ROBERT S. BROWN.